United States Patent
Bollinger et al.

[11] 3,913,084
[45] Oct. 14, 1975

[54] NOISE QUALITY DETECTOR FOR ELECTRIC MOTORS OR OTHER MACHINES

[75] Inventors: John G. Bollinger, Madison; Robert J. Sandberg, Verona, both of Wis.

[73] Assignee: Wisconsin Alumni Research Foundation, Madison, Wis.

[22] Filed: Mar. 26, 1973

[21] Appl. No.: 345,186

[52] U.S. Cl. .................................. 340/261; 73/71.4
[51] Int. Cl. ............................................ G08b 21/00
[58] Field of Search ............ 73/67, 67.2, 71.2, 71.4; 340/261, 248 A

[56] References Cited
UNITED STATES PATENTS

| | | | |
|---|---|---|---|
| 3,195,034 | 7/1965 | Bensema | 340/261 |
| 3,201,776 | 8/1965 | Morrow et al. | 73/71.4 X |
| 3,254,528 | 6/1966 | Michael | 73/71.4 |
| 3,641,550 | 2/1972 | Lynas et al. | 73/67.2 X |
| 3,677,072 | 7/1972 | Weichbrodt et al. | 73/67 |
| 3,681,976 | 8/1972 | Schulz | 73/67 |
| 3,715,659 | 2/1973 | Abnett et al. | 340/261 |

FOREIGN PATENTS OR APPLICATIONS

| 127,015 | 3/1948 | Australia | 73/71.2 |
|---|---|---|---|

OTHER PUBLICATIONS
A. Bar et al., The Noise of Intermittent Mechanisms, Microtecnic, Vol. IX, No. 2, 1955, pp. 59–64, 73–69.

*Primary Examiner*—Richard C. Queisser
*Assistant Examiner*—John P. Beauchamp
*Attorney, Agent, or Firm*—Burmeister, Palmatier & Hamby

[57] ABSTRACT

Such detector is adapted to detect a transducer signal indicative of the level of noise, or the actual measured noise, produced by an electric motor or the like, particularly for the purpose of quality control in connection with a production line, automated or manual, so that motors which produce excessive noise or are defective may be identified and rejected. The detector employs an accelerometer or some other transducer, i.e. a microphone, for receiving the vibration or noise from each motor and converting the noise into electrical signals. After amplification, the signals are sent through a bandpass filter or a plurality of filters which selectively transmit those signals which are within a particular band of frequencies, while attenuating signals which are outside such band. The filter preferably has controls for adjusting both the upper and lower cutoff frequencies of the filter. The output signals from the filter are compared with a predetermined level. One or more indicating devices are operated by the comparison device to indicate whether the detected noise level is above or below such level. The indicating devices may be in the form of lamps or a meter. It is preferred to detect both the peak signal level and the average signal level so that the motor will be rejected if either level is above the desired level. The disclosed device is adapted to detect and indicate the noise quality of a plurality of motors in sequence on an automatic basis.

4 Claims, 5 Drawing Figures

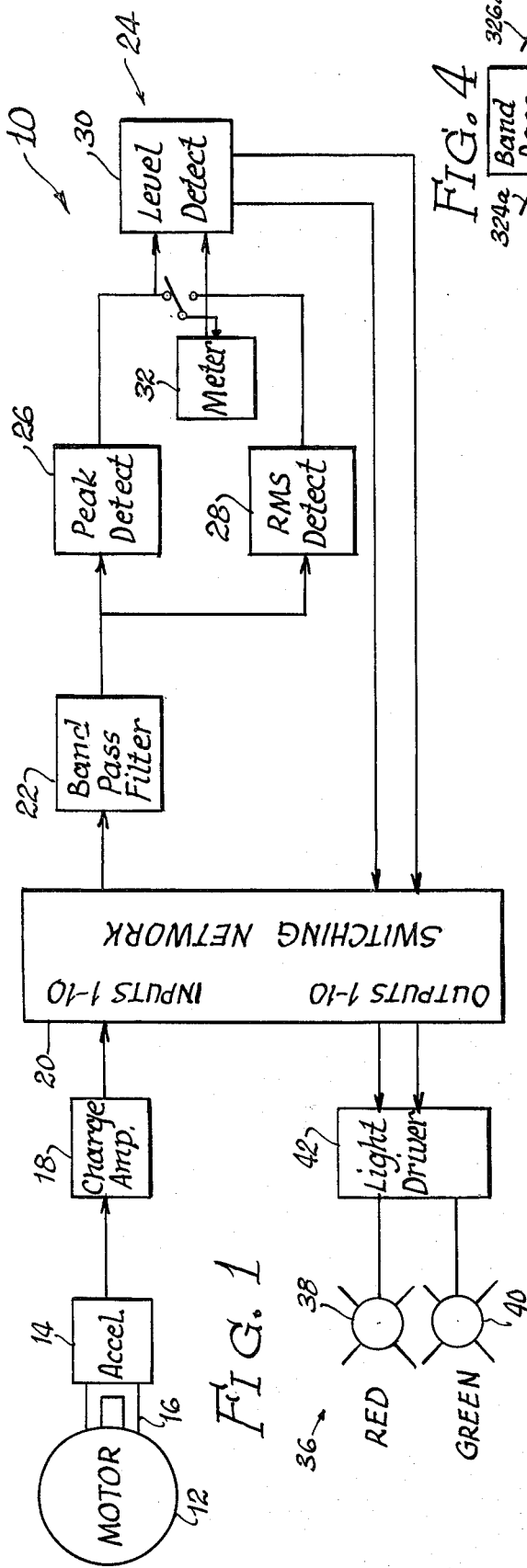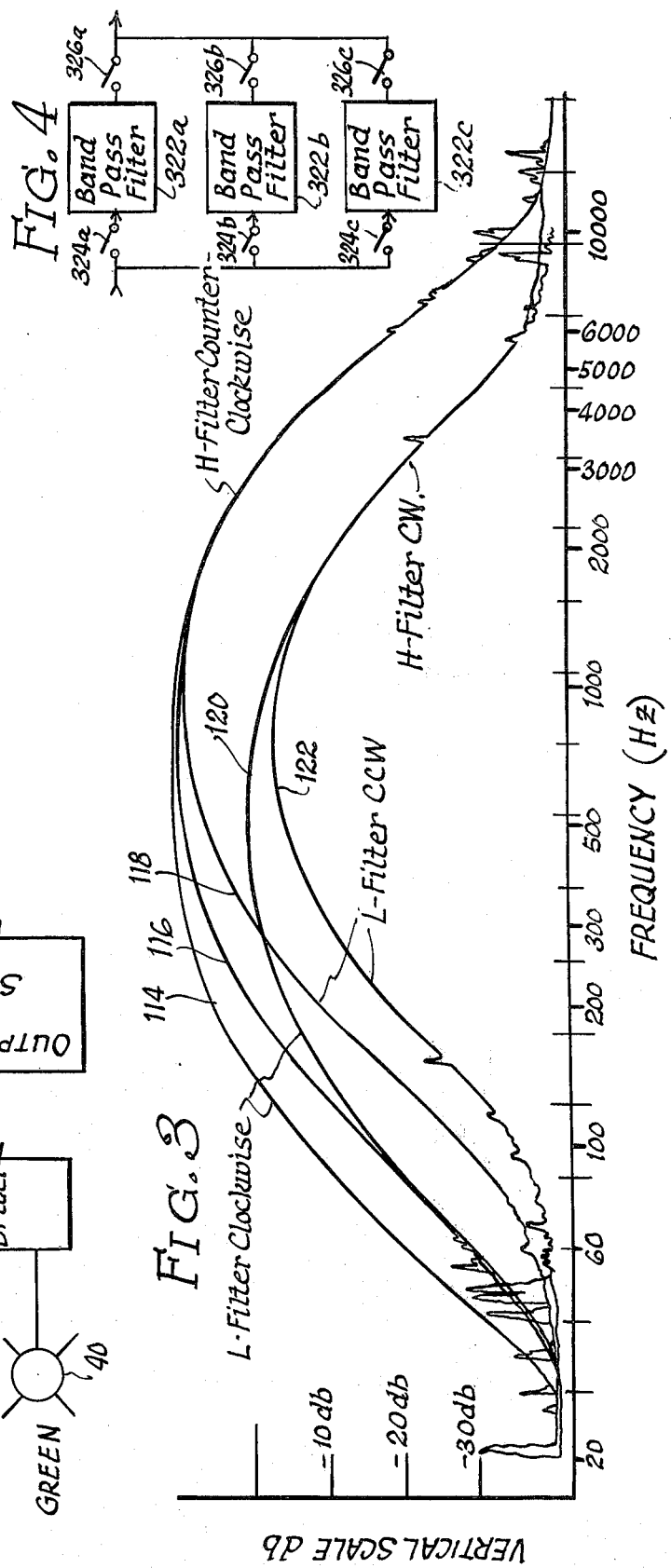

NOISE QUALITY DETECTOR FOR ELECTRIC MOTORS OR OTHER MACHINES

This invention relates to a device for detecting and evaluating the level and character of vibration or noise produced by an electric motor or some other machine or the like.

One object of the present invention is to provide a device which detects the noise produced by a motor or the like within a particular band of frequencies, and indicates whether or not the noise exceeds a level which represents the highest acceptable level of noise for the purpose of quality control.

A further object is to provide such a new and improved device which detects and evaluates both the peak noise level and the average or rms noise level.

Another object is to provide such a new and improved device which operates lamps or other indicators to show whether the magnitude of the noise is above or below the maximum acceptable level.

A further object is to provide such a new and improved device having variable controls for adjusting both the upper and lower limits of the frequency band to which the device is adapted to respond.

It is a further object to provide such a new and improved device which is adapted to test a plurality of motors or the like in rapid sequence on an automatic basis.

Further objects, advantages and features of the present invention will appear from the following description, taken with the accompanying drawings, in which:

FIG. 1 is a block diagram of a noise quality detector to be described as an illustrative embodiment of the present invention.

FIGS. 2a and 2b, when placed side by side, constitute a schematic circuit diagram of the illustrative noise quality detector.

FIG. 3 is a set of graphs illustrating the operation of the variable bandpass filter employed in the noise quality detector.

FIG. 4 is a fragmentary block diagram showing a modified construction.

Figure 2A:
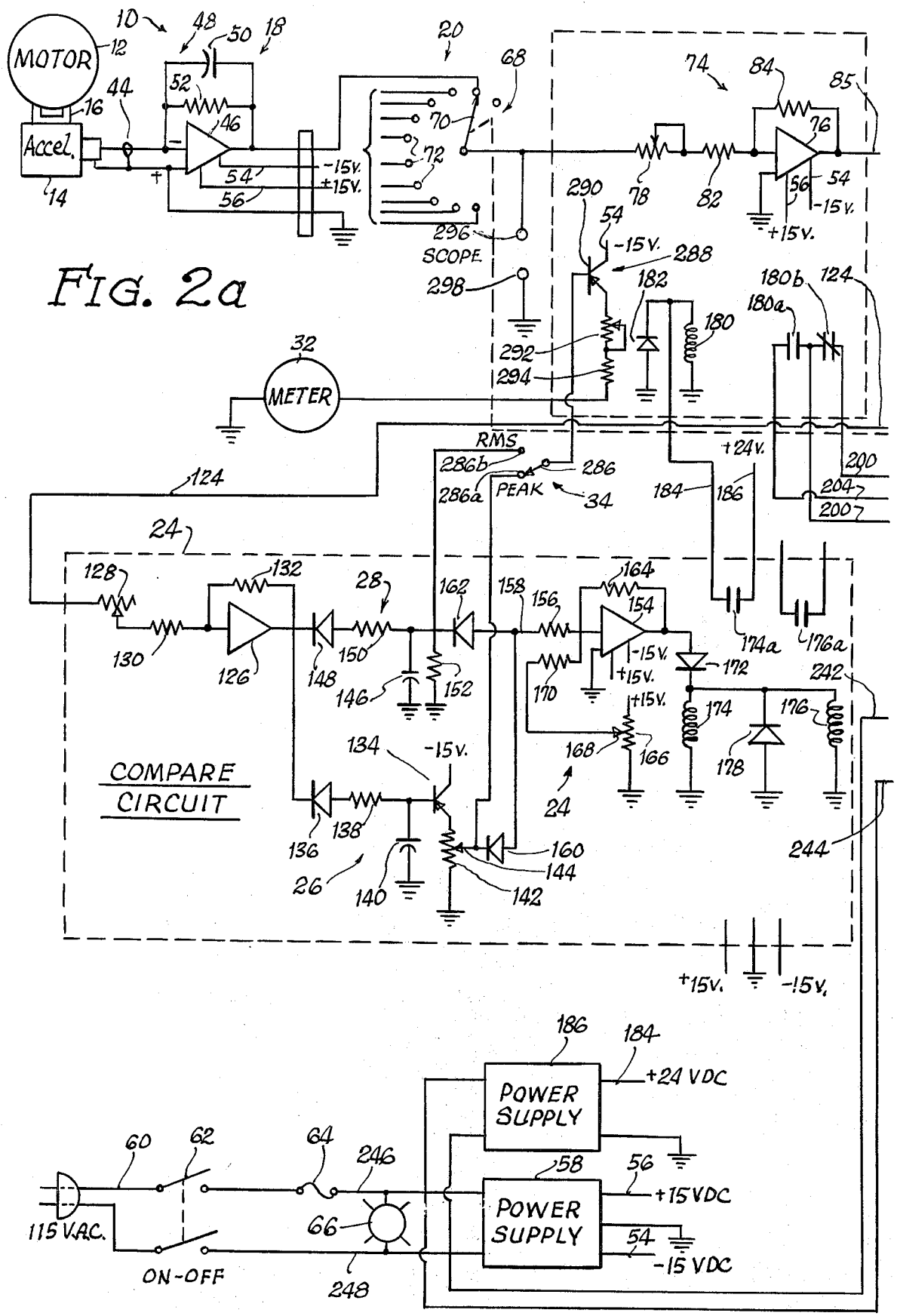

As just indicated, FIGS. 1 and 2 illustrate a device 10 for detecting and indicating the noise produced by one or more motors. Preferably, the device 10 is adapted to test a plurality of motors in quick succession so that the device will be well adapted for testing motors on a production basis. Thus, for example, the illustrated device 10 may be adapted to test a series of ten motors 12 which may be mounted on an appropriate stand or fixture with provision for supplying electrical power to the motors so that they can be operated when they are under test.

A transducer 14 is preferably provided for each motor 12 and is adapted to be mounted on or secured to the motor. Thus, for example, a permanent magnet 16 may be employed to secure the transducer 14 to the motor 12.

The transducer 14 is adapted to receive the noise or vibrations produced by the motor and to translat such vibrations into electrical signals. As illustrated, each transducer 14 is in the form of an accelerometer, but transducers of other types may be employed.

It is preferred to employ an individual amplifier 18 in connection with each transducer 14 to receive and amplify the electrical noise signals from the transducer. In the illustrated arrangement, the output of each amplifier 18 is then supplied to a switching network 20, which is adapted to select the amplified noise signals from each amplifier 18 in turn so that the motors 12 will be sequentially tested. Only a brief interval, such as a few seconds, is required to test each of the motors.

The selected noise signal is fed from the switching network 20 through a bandpass filter 22, which passes a particular band of frequencies, as determined by the initial adjustment of the filter 22. The band of frequencies to be transmitted by the filter 22 depends upon the construction of the motor and the noise specifications to be met by the motor.

A detecting or comparing circuit 24 is preferably provided to determine whether or not the noise signals from the bandpass filter 22 exceed a predetermined level, which represents the maximum acceptable vibration or noise. It is preferred to detect both the peak level of the filtered signals and the average level thereof.

Thus, in the illustrated device 10, the output signals from the bandpass filter 22 are supplied to both a peak detector 26 and an averaging detector 28, which are components of the detecting circuit 24. The output from the peak detector 26 represents the peak level of the noise signals, while the output from the averaging detector 28 may represent the approximate rms (root mean square) or average level. The outputs of both detectors 26 and 28 are preferably fed to a level detector or comparing device 30.

A meter 32 is preferably provided to measure the outputs of the peak detector 26 and the averaging detector 28. In this case, a selector switch 34 is preferably provided for connecting the meter 32 to the output of either of the detectors 26 and 28. The meter 32 is particularly valuable for calibration purposes.

The output of the level detector 30 is preferably connected to an indicating circuit 36, adapted to indicate whether or not the noise signals exceed a permissible level. In the illustrated arrangement, the indicating circuit 36 comprises two lamps 38 and 40, which may be of different colors, such as red and green. A driver circuit 42 may be employed to energize the lamps 38 and 40 in response to the output from the level detector 30.

A set of the lamps 38 and 40 is preferably provided for each motor 12 to be tested. The switching network 20 is arranged to connect the output of the level detector 30 to the driver 42 for each set of lamps in turn.

If the noise signals from any particular motor 12 exceed the premissible level, the output from the level detector 30 causes the corresponding red lamp 38 to be lighted. If the level of the noise signals is below the permissible level, the green lamp 40 is lighted. Within a short period of time, the switching network 20 steps around to each of the motors 12 in turn so that either the red lamp 38 or the green lamp 40 for each motor is lighted. The motors associated with the lighted red lamps are then rejected as failing to comply with the prescribed noise quality standards. The motors associated with the lighted green lamps may be marked as having passed the noise quality inspection.

Figure 2B:
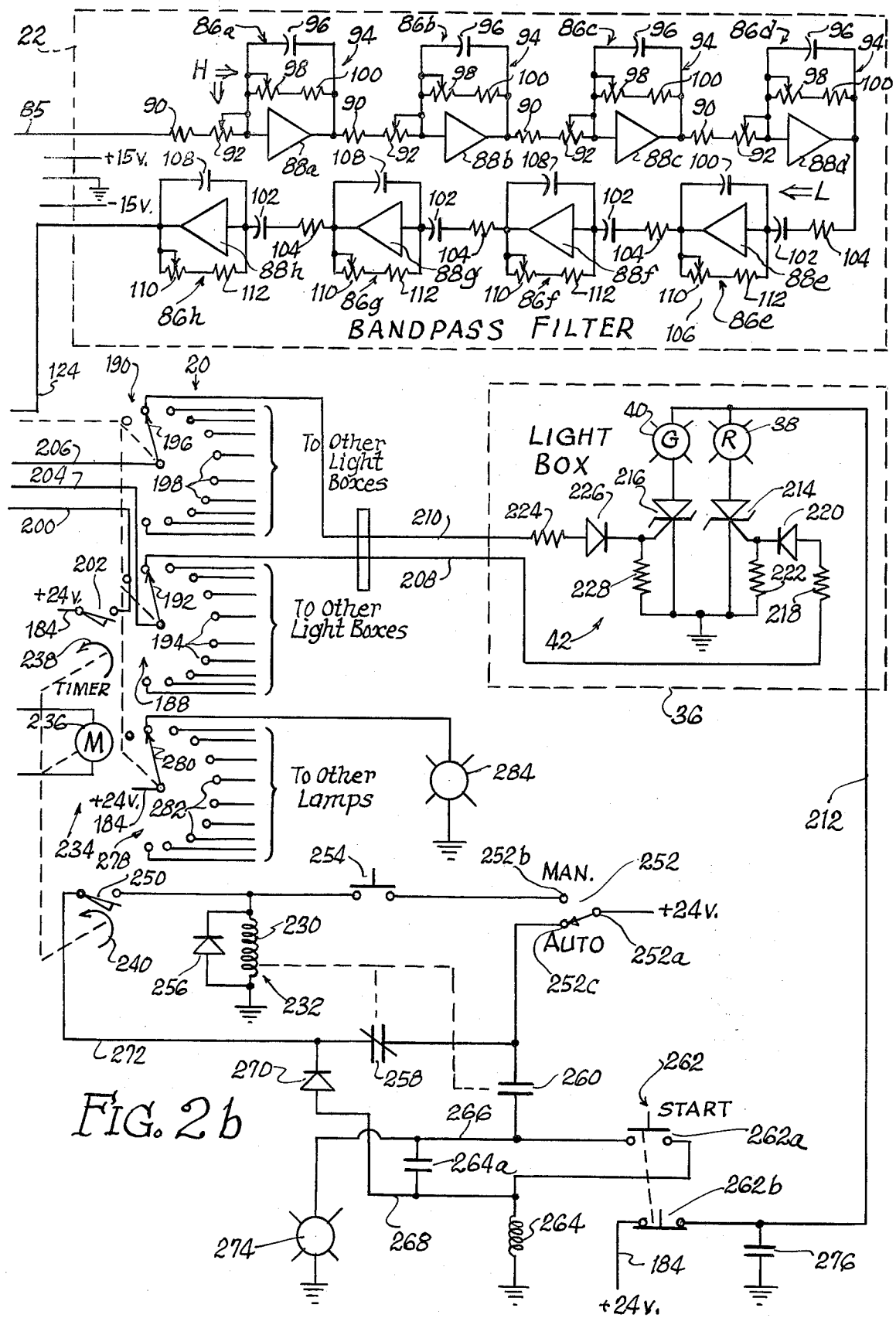

Additional details of the testing device 10 are shown in FIGS. 2a and 2b which should be placed side by side to form a schematic circuit diagram of the device. It will be seen that each transducer 14 is connected to the corresponding amplifier 18 by a shielded cable 44.

As illustrated, the amplifier 18 comprises an integrated operational amplifier module 46 which is preferably of the type utilizing a field effect transistor (FET)

input circuit. The input terminals of the amplifier module 46 are connected to the transducer 14 by the cable 44.

As shown, a negative feedback circuit 48 is connected between the output terminal of the amplifier 46 and one input terminal, the other input terminal being grounded. The feedback circuit 48 may comprise a capacitor 50 in parallel with a resistor 52. As shown, the amplifier module 46 is supplied with power by negative and positive supply leads 54 and 56.

As indicated by the legends in FIG. 2a, the leads 54 and 56 may be supplied with −15 and +15 volts, or any other suitable voltage, both provided by a power supply 58. The input of the power supply 58 is adapted to be connected to electrical utility supply lines 60 through a switch 62 and a fuse 64. As shown, a pilot lamp 66 is connected across the input of the power supply 58 to show when it is energized. The supply lines 60 may be adapted to supply alternating current at 115 volts or any other suitable voltage.

As previously indicated, each motor 12 to be tested is provided with a transducer 14 and amplifier 18. The illustrated testing device 10 is adapted to check ten motors or any other suitable number. To provide for the sequential testing of the motors, the output of each of the ten amplifiers 18 is connected to a multiposition selector switch 68 having a contactor 70 which is movable into engagement with a series of fixed contacts 72.

The selector switch 68 is a component of the switching network 20. Each contact 72 is connected to the output of one of the ten amplifiers 18. Thus, the switch 68 has 10 active positions plus an inactive or rest position adapted to be occupied initially by the switch contactor 70 before it is stepped through the ten active positions.

In the arrangement of FIG. 2a, a preamplifier 74 is provided between the switch contactor 70 and the input to the bandpass filter 22. The amplifier 74 may utilize an integrated operational amplifier module 76. As shown, a variable resistor 78 and a fixed resistor 82 are connected in series between the switch contactor 70 and one input terminal of the amplifier module 76, the other input terminal being grounded. A negative feedback resistor 84 may be connected between the output and input of the integrated operational amplifier module 76. Power for the amplifier module 76 may be supplied by the negative and positive power supply leads 54 and 56. The variable resistor 78 provides a gain control whereby the amplification produced by the amplifier module 74 may be adjusted.

In the circuit of FIGS. 2a and 2b, the output of the preamplifier 74 is connected to the input of the bandpass filter 22 by a lead 85.

The bandpass filter 22 is adapted to pass a particular band of frequencies while attenuating frequencies which are above and below such band. The bandpass filter 22 is preferably of the active type utilizing a plurality of amplifier stages connected in cascade. As shown, the filter 22 comprises eight amplifier stages 86a–h utilizing integrated operational amplifier modules 88a–h.

Each of the first four amplifier stages 86a–d may utilize an input coupling circuit comprising a fixed resistor 90 in series with a variable resistor 92. The illustrated amplifier stages 86a–d comprise negative feedback circuits 94 connected between the output and input terminals of the amplifier modules 86a–d. Each feedback circuit 94 may include a capacitor 96 connected in parallel with the series combination of a variable resistor 98 and a fixed resistor 100.

The variable resistors 92 and 98 make it possible to adjust the high frequency cutoff characteristics of the bandpass filter 22. Preferably, all of the variable resistors 92 and 98 are ganged together for simultaneous operation.

The other four amplifier stages 84e–h are adapted to control the low frequency cutoff characteristics of the bandpass filter 22. As shown, each of the stages 84e–h has an input coupling circuit comprising a capacitor 102 in series with a resistor 104. A negative feedback circuit 106 is connected between the output and the input terminals of each of the amplifier modules 88e–h.

As shown, each feedback circuit 106 comprises a capacitor 108 in parallel with the series combination of a variable resistor 110 and a fixed resistor 112. The variable resistors 110 make it possible to adjust the low frequency cutoff characteristics of the bandpass filter 22. Preferably, all of the variable resistors 110 are ganged together for simultaneous operation.

FIG. 3 comprises a set of graphs showing the manner in which the passband of the filter 22 can be varied by changing the settings of the various variable resistors. It will be seen that FIG. 3 includes three graphs or curves 114, 116 and 118 which represent the high frequency cutoff characteristics of the filter 22 when the variable controls 92 and 98 are adjusted to one extreme position, in this case the extreme counterclockwise position. In addition, FIG. 3 comprises two curves or graphs 120 and 122 representing the high frequency cutoff characteristics when the controls 92 and 98 are adjusted to the other extreme, in this case the clockwise extreme position. It will be seen that the curves 114, 116 and 118 represent a greater high frequency response and an increased cutoff frequency with relation to the curves 120 and 122.

In FIG. 3, the curves 114 and 120 represent the low frequency cutoff characteristics when the low frequency controls 110 are adjusted to one extreme, in this case the clockwise extreme position. The curves 118 and 122 show how the low frequency response is diminished when the low frequency controls 110 are adjusted to the other extreme, in this case the counterclockwise extreme position. The curve 116 represents an intermediate adjustment of the low frequency controls 110. It will be understood that the upper and low frequency limits of the passband may be shifted as desired by varying the values of the components in the bandpass filter circuit 22.

In the circuit of FIGS. 2a and 2b, a lead 124 is connected between the output of the bandpass filter 22 and the input of the comparison circuit 24. As shown, the circuit 24 utilizes an input amplifier 126 which may be in the form of an integrated operational amplifier module. The input lead 124 is connected to the input of the amplifier module 126 through a variable resistor 128 in series with a fixed resistor 130. The variable resistor 128 may serve as a gain control. As shown, a negative feedback resistor 132 is connected between the output and input terminals of the amplifier module 106.

In the comparison circuit 24 of FIG. 2a, the amplifier 126 drives the peak detector 26 and the averaging detector 28. As shown, the peak detector 26 includes a transistor 134 arranged so that its base serves as its input terminal, while its emitter serves as its output terminal. The collector of the transistor 134 is connected to a suitable power supply, in this case the negative power supply lead 54.

The input circuit of the peak detector 26 may comprise a diode rectifier 136 and a resistor 138 connected in series between the output terminal of the amplifier 126 and the base of the transistor 134. A storage capacitor 140 is connected between the transistor base and ground. To adjust the output from the peak detector 26, a potentiometer 142 is preferably connected between the emitter of the transistor 134 and ground. The output of the peak detector 26 appears at the movable contactor or slider 144 of the potentiometer 142.

When noise signals are received from the output of the amplifier 126, such signals are rectified by the diode 136 so that the capacitor 140 is quickly charged to the peak voltage of such signals. Thus, the output from the transistor 134 represents the peak value of the noise signals.

The illustrated averaging detector 28 utilizes an integrated capacitor 146 which is adapted to be charged from the output of the amplifier 126 through a diode rectifier 148 and a resistor 150. To enhance the averaging effect, a discharging resistor 152 is connected in parallel with the capacitor 146. The output of the averaging detector 28 appears across the capacitor 146.

In the comparison circuit 24 of FIG. 2a, the outputs of the peak detector 26 and the averaging detector 28 are both connected to the input of the level detector 24, which may utilize an integrated operational amplifier module 154.

One input terminal of the amplifier module 154 may be grounded, while the other input terminal may be conected to the slider 144 of the potentiometer 142 through a series circuit comprising a resistor 156, a lead 158 and an isolating diode rectifier 160. Another isolating diode resistor 162 is preferably connected between the lead 158 and the ungrounded side of the capacitor 146. Thus, the diode 160 supplies the output of the peak detector 26 to the input of the amplifier 154.

Similarly, the diode 162 supplies the output of the averaging detector 28 to the input of the amplifier 154. Because of the use of the diodes 160 and 162, the input voltage to the amplifier 154 corresponds to the greater of the two output voltages from the peak detector 26 and the averaging detector 28.

As shown, a negative feedback resistor 164 is connected between the output and input terminals of the amplifier 158. To adjust the control lever, a variable bias is supplied to the input of the amplifier 154. For this purpose, a variable potentiometer 166 is connected between the positive supply lead 56 and ground. The potentiometer has a movable contactor or slider 168 which is connected through an isolating resistor 170 to the input of the amplifier 154.

If the input to the amplifier 154 exceeds the level established by the bias from the slider 168 of the potentiometer 166, the amplifier 154 develops an output which is employed to operate indicating means. In the illustrated circuit of FIG. 2a, the output terminal of the amplifier 154 is connected through a diode rectifier 172 to the ungrounded ends of relay coils 174 and 176. Another diode rectifier 178 is reversely connected across such coils 174 and 176. The relay coils 174 and 176 are adapted to operate normally open relay contacts 174a and 176a. In this case, the relay contacts 174a are employed to energize another relay coil 180 having normally open contacts 180a and normally closed contacts 180b. A diode rectifier 182 may be reversely connected across the coil 180. As shown, the relay coil 180 receives its energization from a power supply lead 184 connected to a power supply 186 adapted to supply +24 volts direct current or any other suitable voltage.

As shown in FIGS. 2a and 2b, the switching network 20 is employed to connect the relay contacts 180a and 180b to the driver circuits 42 of the indicating devices 36, which in this case comprise the lamps 38 and 40. It will be seen from FIG. 2b that the switching network 20 comprises selector switches 188 and 190, each of which is operable to a plurality of positions. In this case, the switch 188 has a contactor 192 which is movable into engagement with ten different contacts 194 connected to the indicating devices 36 for the 10 motors 12. Thus, the switch 188 has ten active positions plus an inactive or rest position.

Similarly, the illustrated selector switch 190 has a contactor 196 which is movable into engagement with ten successive contacts 198 so that the switch has 10 active positions plus an inactive or rest position.

As shown in FIGS. 2a and 2b, the contacts 180a and 180b are supplied with power by a lead 200 connected through a timer switch 202 to the power supply lead 184. The lead 200 extends to one of the contacts 180a and one of the contacts 180b. The other contact 180a is connected by means of a lead 204 to the switch contactor 192. The other contact 180b is connected by means of a lead 206 to the switch contactor 196.

Only one of the indicating devices 36 is shown in FIG. 2b. It has input leads 208 and 210 connected to the first active contacts 194 and 198 of the switchs 188 and 190. It will be understood that the other nine indicating devices 36 are similarly connected to the other active contacts 194 and 198.

In the illustrative circuit of FIG. 2b, the indicating device 36 is supplied with power by a lead 212 connected to one side of each of the lamps 38 and 40. The driver circuit 42 is connected to the other side of each lamp. As shown, the driver circuit 42 may comprise control devices in the form of silicon control rectifiers (SCR) 214 and 216 connected in series with the lamps 38 and 40 between the lead 212 and ground. The input lead 208 is connected to the control electrode of the SCR 214 through a resistor 218 connected in series with a diode rectifier 220. Another resistor 222 is preferably connected between the control electrode and ground.

Similarly, a resistor 224 and a diode rectifier 226 are preferably connected in series between the input lead 210 and the control electrode of the SCR 216. A resistor 228 may be connected between the control electrode and ground.

In this case, the multiposition selector switches 68, 188 and 190 are ganged together and are operable by a stepping solenoid 230. Thus, the switches 68, 188 and 190 and the stepping solenoid 230 are components of a stepping switch 232. In accordance with the usual stepping switch arrangement, the selector switches 68, 188 and 190 are advanced through one step when the solenoid 230 is energized. The stepping switch may be advanced through another step by deenergizing the solenoid 230 and then energizing it again. The switches 68, 188 and 190 may thus be stepped from their rest positions through all their active positions and then back to their rest positions.

In order to provide for automatic operation, the testing device preferably comprises a timer 234 which may utilize an electric motor 236. In this case, timer cams 238 and 240 are operated by the motor 236. To energize the motor 236, leads 242 and 244 are connected from the motor to the input power supply leads 246 and 248 for the power supplies 58 and 186. In this way, the motor is supplied with alternating current at 115 volts or any other suitable voltage.

During each cycle of the timer 234, the cam 238 closes the timer switch 202 for a portion of the cycle and then causes the switch 202 to open during the remainder of the cycle. Similarly, the timer cam 240 closes and then opens a second timer switch 250.

The stepping switch 232 can be stopped manually by the proper operation of a selector switch 252 and a push-button switch 254. The selector switch 252 has manual and automatic operating positions. It will be seen that the switch 252 comprises a contactor 252a which is movable between a manual operating contact 252b and an automatic operating contact 252c.

As shown, the contactor 252a is connected to the power supply lead 184 and thus is energized with +24 volts. The manual operating contact 252b is connected to one side of the stepping solenoid 230 by the push-button switch 254, the other side of the solenoid being grounded. A reversely connected diode rectifier 256 is preferably connected across the solenoid 230.

When the selector switch 252 is in its manual position, the stepping solenoid 230 can be energized by closing the push-button switch 254. In this way, the stepping switch 232 can be stepped through all of its positions, as desired.

To provide for automatic operation, the stepping switch 232 is adapted to operate contacts 258 and 260. The contacts 258 are closed when the stepping switch 232 is in all ten of its active positions and is open when the stepping switch is in its inactive or rest position. The contacts 260 are open in all of the active positions of the switch 232 and are closed in the inactive or rest positions.

It will be seen that the contacts 258 are connected in series with the timer switch 250 between the automatic operating contacts 252c of the switch 252 and the ungrounded side of the stepping solenoid 230. When the stepping switch 232 is in any of its active positions, the contacts 258 are closed so that the solenoid 230 is energized whenever the timer switch 250 is closed. Thus, the stepping switch 232 is stepped by the closing and opening of the timer switch 250.

A starting switch 262 is preferably provided to start the cycle of the stepping switch 232. As shown, the starting switch 262 is of the push-button type and comprises normally open contacts 262a and normally closed contacts 262b. In the illustrated arrangement, the contacts 260 and the normally open starting contacts 262a are connected in series between the automatic operating contact 252c and the underground side of a relay coil 264 having normally open contacts 264a. It will be seen that the contacts 264a are connected in parallel with the contacts 262a to serve as holding contacts.

When the stepping switch 232 is in its inactive or rest position, the contacts 260 are closed. When the starting contacts 262a are closed manually, the relay coil 264 is energized through the contacts 260 and 262a. The closure of the holding contacts 264a maintains the energization of the relay coil 264, after the push-button switch 262 has been released.

In the illustrated arrrangement of FIG. 2b, an alternate energization circuit for the solenoid 230 is the stepping switch 232 is established and maintained by the closure of the starting contacts 262a and the subsequent closure of the holding contacts 264a. Such circuit can be traced from the power supply lead 184 through the switch contactor 252a, the automatic contact 252c, the contacts 260 operable by the solenoid 230, a lead 266, the relay contacts 264a, a lead 268, a diode rectifier 270, a lead 272, and the timer switch 250. It will be recalled that the contacts 260 are closed when the stepping switch 232 is in its rest or inactive position. The closure of the contacts 260 also energizes a pilot lamp 274 which is connected between the lead 266 and ground. The lamp 274 serves as a ready light to indicate that the stepping switch 232 has returned to its home position and that a new cycle can be completed by operating the starting switch 262.

When the relay coil 264 has been energized by the closure of the starting contacts 262a, the closure of the timer switch 250 is effective to energize the stepping solenoid 230. This causes the stepping of the switch 232 to its first active position in which the first motor 12 is to be tested. The stepping of the switch 232 also closes the contacts 258 while opening the contacts 260.

For the remainder of the cycle of the stepping switch 232, the solenoid 230 is energized through the contacts 258 whenever the timer switch 250 is closed. The opening of the contacts 260 deenergizes the relay coil 264 so that the relay contacts 264a are also opened.

The normally closed contacts 262b of the starting switch 262a are connected into the energizing circuit for the indicating devices 36. Such circuit may be traced to the power supply lead 184 through the contacts 262b to the lead 212 which extends to all of the indicating devices 36 so as to provide power for the lamps 38 and 40.

The opening of the starting contacts 262b removes the power from the indicating devices 36 so that all of the lamps 38 and 40 are extinguished. The removal of the power due to the momentary opening of the starting contacts 262b also resets all of the SCRs 214 and 216 to nonconductive states in preparation for the new cycle of the stepping switch 232. During such cycle, the lamps 38 and 40 are energized under the control of the comparison circuit 24 as the successive motors are tested.

As shown in FIG. 2b, a capacitor 276 is connected between the lead 212 and ground to provide a slight delay in the deenergization of the indicating devices 36 so as to minimize the possibility that the indicating devices 36 will be reset accidentally by a slight bumping of the push-button switch 262.

In order to indicate the current position of the stepping switch 232, it is preferred to provide the switch with an additional selector switch 278 comprising a contactor 280 which is movable sequentially into engagement with a plurality of contacts 282 corresponding to the ten active positions of the switch. As shown, the contactor 280 is connected to the power supply lead 184, while the contacts 282 are connected to individual pilot lamps 284. As the switch 232 is stepped through its cycle, the lamps 284 are energized in sequence to identify the particular motor which is under test.

As previously mentioned, the meter 32 makes it possible to measure the magnitude of the noise signals produced by the motor under test. The selector switch 34 supplies either the peak noise signal level or the RMS average level to the meter 32. As shown in FIG. 2a, the switch 34 has a contact 286 which is movable between peak and RMS contacts 286a and 286b connected to the outputs of the peak and averaging detectors 26 and 28, respectively. Thus, the contact 286a is preferably connected to the slider 144 of the potentiometer 142, while the contact 286b is connected to the ungrounded terminal of the averaging capacitor 146.

An amplifier 288 is preferably provided to operate the meter 32. As shown in FIG. 2a, the amplifier 288 utilizes a transistor 290 having two collectors connected to the negative power supply lead 54. An energizing circuit for the meter 32 extends from the emitter of the transistor 290 through a variable resistor 292, a fixed resistor 294 and the meter 32 to ground. The base of the transistor 290 is connected to the contactor 286 of the switch 34.

At times, it may be desirable to observe the waveform of the noise signals from any particular motor on an oscilloscope. For this purpose, the testing device 10 is provided with oscilloscope terminals 296 and 298. The terminal 296 is connected to the contactor 70 of the selector switch 68, while the terminal 298 is grounded.

In normal operation, the testing device 10 is adapted to test up to ten motors in rapid succession. The motors 12 are mounted on their test fixtures and are energized so that they will be operated at normal speed. The accelerometers 14 are mounted on the motors 12. Each accelerometer 14 acts as a transducer to develop electrical noise signals, which are amplified by the corresponding amplifier 18. Preferably, each amplifier 18 is of the charge amplifier type, having a FET input circuit to provide high input impedance.

For automatic operation, the stepping switch 232 should initially be in its inactive or rest position. If the switch 232 is in some other position, it should be stepped manually to its rest position by setting the selector switch 252 in its manual position and operating the push-button switch 254, which energizes the stepping solenoid 230. When the stepping switch 232 has been stepped to its rest position, the switch 252 is shifted to its automatic position. The automatic cycle is then started by operating the push-button starting switch 262. The closure of the contacts 262a energizes the holding relay 264, while the opening of the contacts 262b resets all of the SCRs 214 and 216 to their nonconductive states so that all of the indicator lamps 38 and 40 will be energized.

The timer 234 has a short cycle amounting to five seconds or less. When the relay 264 has been energized, the closure of the timer switch 250 by the cam 240, occurring within the time required for one timer cycle, energizes the stepping solenoid 230 so that the various selector switches 68, 188, 190 and 278 are stepped to their first active position for testing the first motor. This is the position in which the selector switch are shown in FIGS. 2a and 2b.

The noise signals from the first transducer 14 are amplified by the amplifier 74 and filtered by the bandpass filter 22, which passes a particular band of frequencies, while attenuating higher and lower frequencies. The output signals from the filter 22 are amplified by the amplifier 126 and fed to the peak detector 26 and the averaging detector 28.

The outputs from the detectors 26 and 28 are supplied to the input of the level detector 24 by the diodes 160 and 162. If either the peak detector output or the averaging detector output exceeds the level established by the bias control 166, the amplifier 154 develops an output which energizes the relay 174 so as to close the relay contacts 174a. This energizes the relay 180 so as to close the contacts 180a, while opening the contacts 180b. If neither the peak detector output nor the averaging detector output exceeds the comparison level, the relays 174 and 180 are not energized. Thus, the contacts 180a remain open, while the contacts 180b remain closed.

The timer cam 238 is preferably adjusted so that the timer switch 202 is closed, a short time after the closure of the switch 250. This short time interval is sufficient to allow the peak detector 26 and the averaging detector 28 to develop stable output signals. When the timer switch 202 is closed, the red light 38 is energized if the relay contacts 180a are closed. However, if the relay contacts 180b are closed, the green light 40 is energized. The red light indicates that the noise level produced by the motor is excessive, while the green light indicates that the noise level is acceptable.

In some cases, the relay 180 may be energized after the timer switch 202 is closed, in which case both the red and green lights 38 and 49 will be energized. This is taken as an indication that the motor is of marginal noise quality and should be rejected.

The light driver circuit 42 has a holding action in that the SCRs 214 and 216 remain conductive after they have been triggered into conduction. Thus, the energization of the red light 38 or the green light 40 is maintained throughout the cycle of the stepping switch 232, until a new cycle is started.

The timer 234 may have a cycle less than of about five seconds or less so that the stepping switch 232 is stepped through all ten of its active positions and back to its rest position in less than 1 minute. The stepping switch 232 stops in its rest position because the contacts 258 are opened when the switch reaches the rest position.

To start another automatic cycle, it is necessary to operate the push-button switch 262. The opening of the contacts 262b deenergizes all of the lamps 38 and 40 and resets all of the SCRs 214 and 216 to their nonconductive state.

If it is desired to make a closer analysis of any particular motor, the stepping switch 232 may be stepped manually to the operating position for such motor. Thos may be done by operating the selector switch 252 to its manual position. If desired, all of the red and green indicator lights 38 and 40 can be extinguished or cleared by operating the push-button starting switch 262. The push-button switch 254 may then be operated repeatedly to energize the stepping solenoid 230 through enough cycles to bring the stepping switch 232 to the desired position. The meter 32 may then be employed to measure the output voltages from the peak detector 26 and the averaging detector 28. The meter switch 34 is employed to switch the meter between the peak detector output and the RMS averaging detector output.

The testing unit 10 is adapted to test for both the average and peak voltage levels of the filtered noise signals from each motor 12. If either or both voltage levels are above a set level, conveniently set at 100 on the meter 32, the motor 12 will be rejected.

Three adjustments are necessary to set the quality level, namely the gain control 128, the bias control 166 and the peak level control 142.

To properly set the levels, it is necessary to have a detailed study of a group of marginally acceptable and not acceptable motors. The average reading for an acceptable motor is generally considerably less than the peak voltage reading for an acceptable motor. A motor with marginally acceptable average and peak levels is ideal for setting up the quality levels. With the motor 12 running, the adjustment is made by setting the meter selector switch 34 on average and adjusting the gain control 128 to produce a reading of 100 on the meter 32. Then, the bias control 166 is adjusted so that the output of the amplifier 154 is near zero, or the red light 38 does not come on. Then the peak level control 128 may be adjusted to just produce a reading of 100 on the meter 32 with the meter switch 34 set in the peak position.

The filtering characteristics of the bandpass filter are variable over a considerable range and should be adjusted in accordance with the specifications established by a detailed noise analysis of a specific motor. Both the high and low break frequencies of the passband are adjustable by operation of the ganged variable resistors or potentiometers 92, 98 and 100.

The lower break frequency of the high-pass filter section is adjusted by rotation of the variable resistors 110. Rotation of these resistors 110 fully clockwise moves the break frequency to the lowest frequency, approximately 160 Hz in the specific example illustrated in the curves of FIG. 3. Rotation of the variable resistors 110 counterclockwise moves the low break frequency to approximately 320 Hz.

The upper break frequency of the low-pass filter section is adjusted by rotation of the potentiometers or variable resistors 92 and 98. Rotating these resistors 92 and 98 fully counterclockwise moves the break frequency to approximately 3000 Hz, as shown in FIG. 3. Rotation of the resistors 92 and 98 fully clockwise moves the upper break frequency to approximately 1600 Hz. The frequency range of the bandpass filter can be changed by changing the component values.

As shown in FIG. 4, the bandpass filter 22 may be replaced with a plurality of bandpass filters 322a, 322b and 322c. Any desired number of bandpass filters may be employed, having different band width settings, so that the detector apparatus of the present invention can be used to isolate various sources of trouble within the motor under test. Switches 324a, 324b and 324c and 326a, 326b and 326c may be employed to select the desired bandpass filter so that any or all of the filters are selectively useable.

Those skilled in the art will readily be able to assign specific values to the various components of the illustrated testing device 10. Moreover, the values may be varied to a considerable extent to suit various conditions.

It may be worthwhile pointing out the following: It has been established that motors and other devices may be rejected for their vibration or noise level for one of several reasons. First, in any given bandwidth of frequency there may be information related to malfunction. Second, this information may appear as a steady signal, which is identified by the rms or average detection circuit, or the information may be modulated at a lower frequency due to other physical phenomena which is best identified by the peak detection circuit.

We claim:

1. A device for detecting, measuring and characterizing the vibration or noise produced by a machine or other unit, comprising a transducer for receiving the vibration or noise from such unit and converting the vibration or noise into electrical signals, at least one band-pass filter for receiving and selectively transmitting the electrical signals from said transducer within a selected band of frequencies, an indicating device for indicating excessive vibration or noise, a peak detector for receiving the output signals from said filter and developing a peak detector output corresponding to the peak value of said output signals, comparison means for actuating said indicating device if the input to said comparison means exceeds a predetermined level, a first diode for supplying said peak detector output to the input of said comparison means, an averaging detector for receiving the output signals from said filter and developing an averaging detector output corresponding to the average value of said output signals, and a second diode for supplying the averaging detector output to the input of said comparison means, whereby said comparison means is responsive only to the larger of said peak detector output and said averaging detector output, the larger of said outputs being effective to back bias the diode which would otherwise supply the smaller of said outputs.

2. A device according to claim 1, including adjusting means for adjusting the level of at least one of said detector outputs in relation to the predetermined level established by said comparison means.

3. A device according to claim 1, in which said comparison means includes means for adjusting the predetermined level established by said comparison means.

4. A device according to claim 1, in which said comparison means includes means for adjusting the predetermined level established by said comparison means, said device including means for adjusting theh level of at least one of said detector outputs in relation to the predetermined level established by said comparison means.

* * * * *

UNITED STATES PATENT OFFICE
CERTIFICATE OF CORRECTION

Patent No. 3,913,084              Dated   October 14, 1975

Inventor(s)  Bollinger et al

It is certified that error appears in the above-identified patent and that said Letters Patent are hereby corrected as shown below:

Column 8, line 4, "is" should be "of".

Column 8, line 9, insert "operating" at the end of the line.

Column 8, line 36, "traced to" should be "traced from".

Column 9, line 53, "energized" should be "deenergized".

Column 9, line 61, "switch" should be "switches".

Column 12, line 57, "theh" should be "the".

Signed and Sealed this twenty-third Day of March 1976

[SEAL]

Attest:

RUTH C. MASON
Attesting Officer

C. MARSHALL DANN
Commissioner of Patents and Trademarks